Nov. 30, 1954  J. F. CAVANAGH  2,695,730
HOPPER FOR FEEDING GEMS
Filed May 5, 1950  2 Sheets-Sheet 1
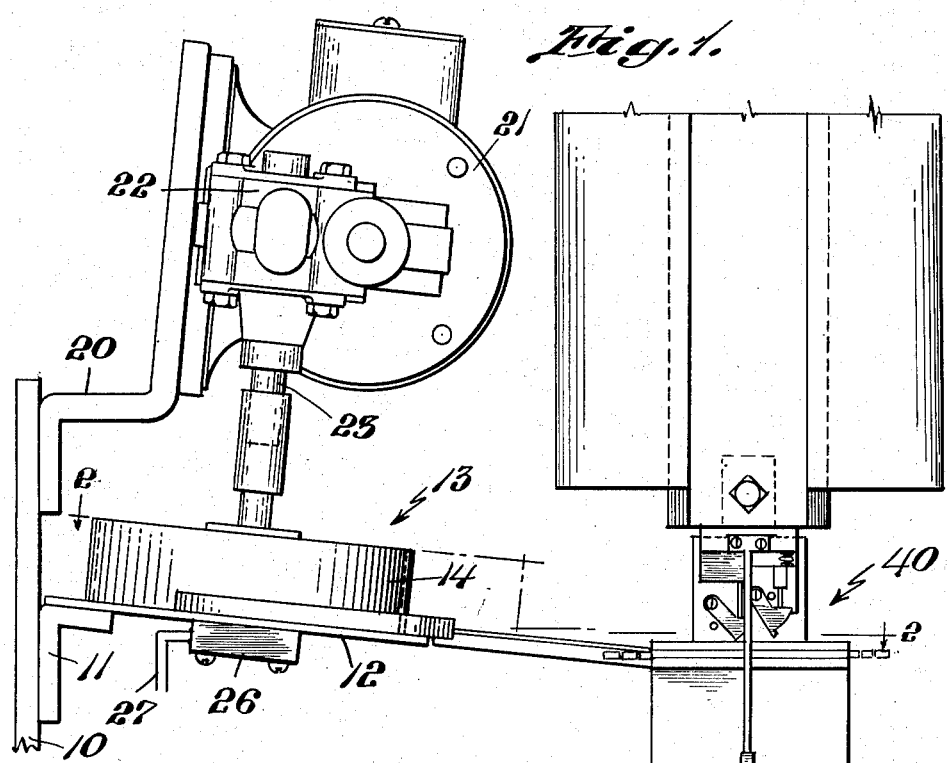
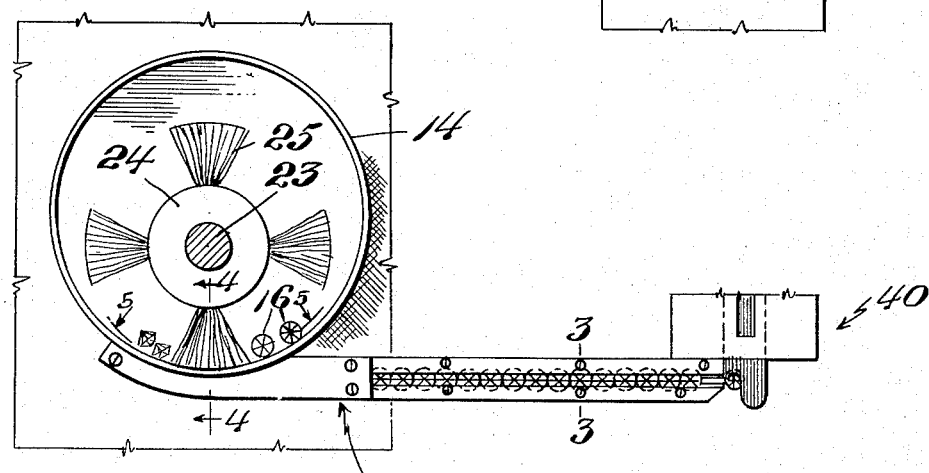
INVENTOR.
John F. Cavanagh
BY
Barlow & Barlow
ATTORNEYS.

Nov. 30, 1954 J. F. CAVANAGH 2,695,730
HOPPER FOR FEEDING GEMS
Filed May 5, 1950 2 Sheets-Sheet 2

INVENTOR.
John F. Cavanagh
BY
Barlow & Barlow
ATTORNEYS.

United States Patent Office 2,695,730
Patented Nov. 30, 1954

2,695,730

HOPPER FOR FEEDING GEMS

John F. Cavanagh, Cranston, R. I., assignor to John Moretti, Cranston, R. I.

Application May 5, 1950, Serial No. 160,157

4 Claims. (Cl. 221—168)

This invention relates to a hopper assembly for receiving gems and feeding them into and along a conduit for delivery to some machine where they will be further manipulated such, for instance, as setting the gems into a work piece.

One of the objects of this invention is to provide a hopper or receptacle into which small gems such as those having conical backs may be loosely dumped with a means to separate the gems passing them out of the hopper and along a conduit in a predetermined and definite position for further handling.

Another object of this invention is the provision of means within the hopper for sweeping the gems which are not properly positioned out of the way that gems having a correct position may be caused to move as desired.

Another object of the invention is to utilize an agitator for keeping the gems within the receptacle or hopper in a constant motion so that the gems may assume different positions with reference to one or more openings through which the gems may pass.

Another object of the invention is to utilize an agitator for feeding the gems along a conduit from the hopper in a continuous controlled flow of the gems and in a definite relation for further operation.

With these and other objects in view, the invention consists of certain novel features of construction, as will be more particularly described and pointed out in the appended claims.

In the accompanying drawings:

Figure 1 is a side elevation looking at right angles to the brush shaft illustrating the hopper and agitators and also a fragmental portion of an apparatus looking at right angles to it to which the gems are fed;

Figure 2 is a sectional view on line 2—2 of Figure 1 looking into the hopper and onto the feeding conduit from the hopper and omitting some of the apparatus;

Figure 3 is a section on line 3—3 of Figure 2 through the feeding conduit;

In proceeding with this invention I provide a hopper or receptacle into which gems may be dumped in a loose state with a rotating brush sweeping the gems toward openings in a side wall of the hopper so that the gems which are correctly positioned will pass through the opening while the gems which are not correctly positioned will be swept away from the opening, leaving the openings clear for the passage therethrough of correctly positioned gems. The hopper will be inclined so that the gems will tend to move toward the opening through the side wall and I will also vibrate the hopper so as to use gravity to move the gems toward the openings. A conduit will be positioned adjacent the opening through the side wall so that the gems will be conducted away from the hopper and through vibration moved by gravity along the inclined conduit to the desired position for further operation.

Figure 5:
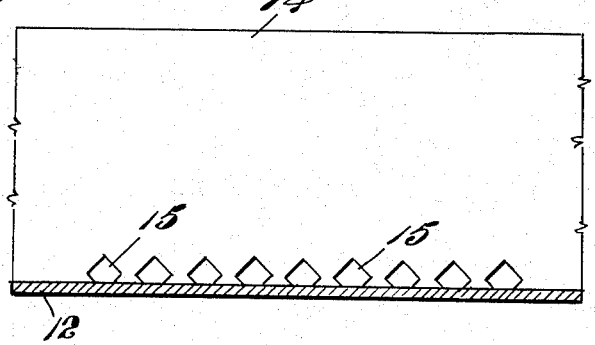
Figure 5 is a fragmental view of the side wall of the hopper illustrating openings therein through which the gems may pass.

With reference to the drawings, 10 designates a support to which a bracket 11 is attached to support a base 12 of a hopper designated generally 13 and comprising a receptacle formed by an extending cylindrical wall 14. The base is inclined and adjacent the low point the cylindrical wall 14 is provided with a plurality of openings 15 which are shaped in accordance with the cross sectional shape of the gems 16 which are to be fed from the hopper. A plurality of such openings as shown in Figure 5 are provided so that several gems may be passed through several openings at the same time into a conduit designated generally 17 for conveying the gems away from the hopper. A bracket 20 supports an electric motor 21 and through reducing gears in casing 22 drives a shaft 23 upon the lower end of which is mounted a hub 24 of an agitating and brushing device having a plurality of groups 25 of bristles.

Figure 6:
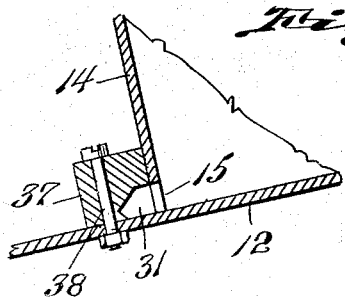
Figure 6 is a fragmental section of the hopper showing the inclination of the bottom wall toward the gem openings.

The bottom wall or base 12 of the hopper as mentioned above is inclined to the horizontal so that the bottom tips toward the openings 15 in one direction as shown in Figure 6 and is raised at an angle to the horizontal as shown in Figure 1. The shaft 23 extends at right angles or perpendicular to the bottom wall 12, but is located eccentric to the central axis of the cylindrical wall 14 as shown in Fig. 2, so that the bristles of the brush sweep the gems 16 upwardly as viewed in Fig. 1 although downwardly as viewed in Figure 6. The bristles being of such extent as to bend slightly as they engage the side wall 14 in the vicinity of the openings 15 thus causing the gems which are swept ahead of the bristles to be pressed gently against the side wall in the vicinity of the openings and causing any gems which are properly positioned relative to the openings to pass through the openings 15.

In order to keep the gems in a greater state of turbulence and also to feed the gems along the conduit 17, I provide an electrical vibrator 26 secured beneath the base 12 (see Fig. 1) which has leads 27 to some source of power and which will keep the gems in a state of turbulence rolling them somewhat one about the other and causing the gems to jump vertically in the hopper as the agitation occurs.

The conduit 17 is inclined and comprises a plate 30 which is grooved as at 31 to substantially conform to the flat top and side taper 33 of the top of the gems while plates 34 overhang the groove 31 and are tapered as at 35 so as to fit the bottom of the stone, these upper plates are held on by screws 36 at spaced intervals as shown in Figs. 2 and 3. The point of the gem is exposed and extends upwardly in the space between the plates 34 and the agitation will serve to feed the gems along this conduit.

Figure 4:
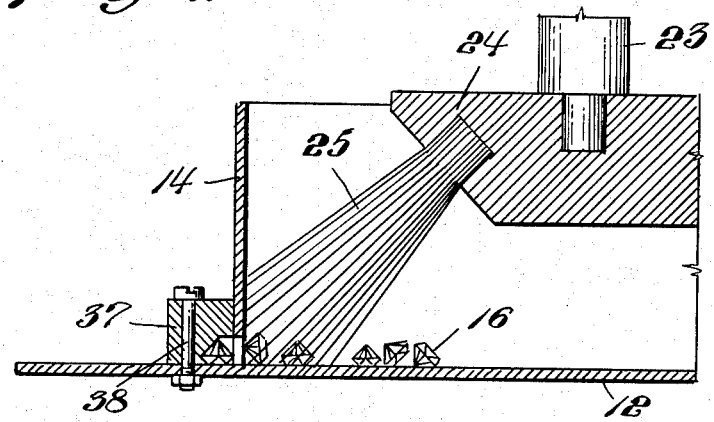
Figure 4 is a sectional view through a fragmental portion of the hopper on line 4—4 of Figure 2.

This conduit as shown in Figure 4 is closed in as at 37 adjacent the openings in the side wall and is there held to the base 12 by bolt 38 after the gem gets into this conduit it will be maintained in the inverted position shown in Figure 3 until it reaches the tool designated 40 where further operation on the gem will occur. This further operation is the subject of another application.

I claim:

1. A hopper for feeding gems, said hopper being cylindrical and having a bottom wall and a side wall extending upwardly with an opening therethrough for the gems to be fed from said hopper, the bottom wall of said hopper being slanted for the gems to tend to move toward said opening by gravity, means to vibrate the said bottom wall to agitate the gems, a shaft rotating in said hopper about an axis positioned at a location between the axis of said hopper and the said opening, said shaft carrying spaced tufts of bristles projecting into sweeping engagement with the wall porftions of said hopper adjacent said opening to engage and move a gem through said opening and means to conduct gems from said opening.

2. A hopper for feeding gems of a uniform shape and having a plurality of facets on one side thereof and with the sides of said gems opposite to said facets being coated to provide reflecting surfaces, said hopper having a bottom wall and a side wall with an opening therethrough of substantially the inverted shape of the cross section of the said gem to be fed from said hopper in an inverted position, said bottom wall being positioned on a slant for the said gems to tend to gravitate toward said opening, means to vibrate said bottom wall to agitate the said gems, a brush rotating in said hopper about an axis eccentric to the axis of said hopper with the bristles of said brush projecting into sweeping engagement with the side and bottom wall portions about said openings to engage and move a gem through said opening and a conduit from said opening having a track open at the top to receive from said opening said gems passing therethrough in the inverted position, said conduit being positioned on a slant for the gems to slide therealong on the uncoated side thereof.

3. A hopper for feeding gems of irregular cross sectional shape, said hopper having a bottom wall and a side wall extending upwardly with an opening therethrough adjacent to said bottom wall for the gems to be fed from said hopper, said opening having substantially the cross sectional shape of the gems, said bottom wall being positioned on a slant for the said gems to gravitate toward said opening, a brush rotating in said hopper about an axis eccentric to the axis of said hopper with the bristles of said brush projecting into sweeping engagement with the side and bottom wall portions about said opening to engage and move a gem through said opening, the revolving brush serving to remove gems which do not align themselves with the cross sectional shape of said opening.

4. A hopper for feeding gems as set forth in claim 3 wherein said brush is provided with spaced tufts of bristles.

References Cited in the file of this patent

UNITED STATES PATENTS

| Number | Name | Date |
|---|---|---|
| 594,617 | Goodkind et al. | Nov. 30, 1897 |
| 1,302,794 | Harmon | May 6, 1919 |
| 1,545,376 | Weatherby | July 7, 1925 |
| 1,739,422 | Schmidt | Dec. 10, 1929 |
| 1,916,781 | Blatchford | July 4, 1933 |
| 1,922,425 | Evans | Aug. 15, 1933 |
| 2,054,552 | Wakeham | Sept. 15, 1936 |
| 2,116,398 | Makenny | May 3, 1938 |
| 2,241,633 | Groce et al. | May 13, 1941 |
| 2,433,684 | Damond | Dec. 30, 1947 |